R. F. FAIRLIE.

Car-Coupling.

No. 9,147. Reissued April 13, 1880.

WITNESSES:

C. Sedgwick

C. Neveux

INVENTOR:

R. F. Fairlie

BY Munn & Co

ATTORNEYS.

N. PETERS, PHOTO-LITHOGRAPHER, WASHINGTON, D. C.

UNITED STATES PATENT OFFICE.

ROBERT F. FAIRLIE, OF LONDON, ENGLAND.

CAR-COUPLING.

SPECIFICATION forming part of Reissued Letters Patent No. 9,147, dated April 13, 1880.

Original No. 87,158, dated February 23, 1869. Application for reissue filed January 10, 1880. Patented in England April 22, 1868.

*To all whom it may concern:*

Be it known that I, ROBERT F. FAIRLIE, of London, England, have invented a new and useful Improvement in Railway Carriages and Wagons and in Means for Coupling them Together, which invention was patented in England April 22, 1868, No. 1,321, of which the following is a specification.

This invention relates to a peculiar construction and arrangement of railway carriages and wagons, and to an improved mode of coupling them together to form a train, whereby friction is considerably reduced, unpleasant shocks are avoided, the length of the train for a given quantity of passengers or goods is shortened, and other advantages are obtained, as I will proceed more particularly to describe, and for that purpose shall refer to the accompanying drawings.

Figure 1:
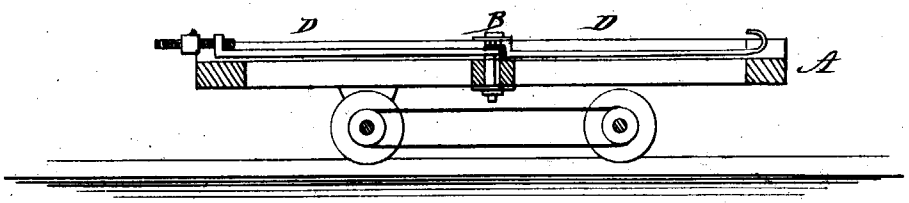
Figure 2:
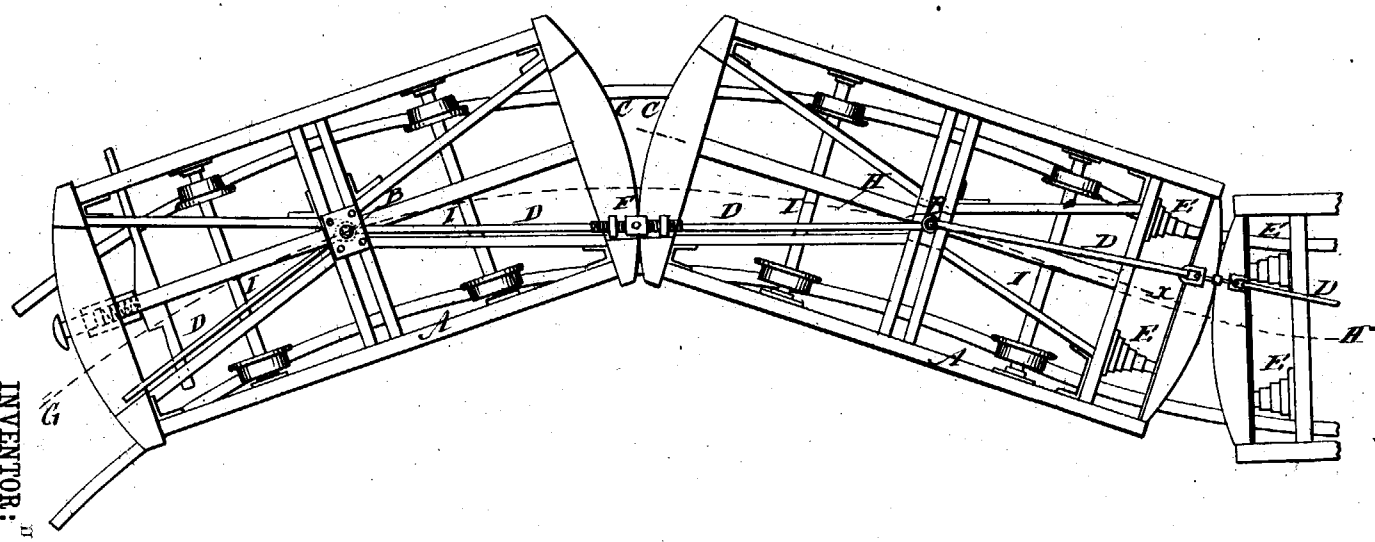

Figure 1 is a sectional side elevation of the under framing only of a carriage or wagon constructed and fitted with coupling devices in accordance with my invention. Fig. 2 is a plan view, showing a set of the carriages or wagons coupled together.

Similar letters of reference indicate corresponding parts.

According to this invention the under frames or trucks, A, of the carriages or wagons of a train are coupled together from center to center, B B, of the framing, in lieu of being coupled at the extremities of the frames, as heretofore; and I also purpose to substitute for the ordinary buffers a curved abutting surface, C, on the end of each framing, the curve being struck from the coupling center B.

The coupling and traction bars D D may be either rigid, as shown in the drawings, or combined with the usual or other draw-springs, and may consist of chains for a portion of their length, and the curved abutting heads C C may also be either rigidly fixed to the framing, as shown at two of the couplings in Fig. 2, or be combined with metal or india-rubber springs for the sake of elasticity, as shown at E E in Fig. 2. The curved ends may be lined with india-rubber, and should be covered with sheet-iron plating.

The coupling-bars D D, which are hung at each end to the centers B B of the several truck-frames of the carriages or wagons, may be divided between the wagons, as shown in the drawings, and connected by any convenient arrangement of coupling, such as the right-and-left-hand screw F, for the facility of drawing the wagons together tightly.

The bars D D may be either above the frames, as shown in the drawings, or below the frames.

It is obvious that this coupling-bar will always form the chord of the arc or curve (shown by the line G H in Fig. 2) traversed by the wagons and carriages so coupled together, and as the traction force is through the said chord the line of draft will always, when passing over curves, be situate between the center line, G H, of the curved track and the inner rail of the curve, as seen clearly in Fig. 2, in lieu of outside the center line, as in the ordinary coupling.

By the arrangement before described the centers of the axles I I of the several truck-frames A are always left in the same relative position to or distance from each other, and consequently motion may be communicated from one to the other by means of driving straps, bands, or chains, in conjunction with pulleys fast on the axles, which will be readily understood without the necessity of drawings.

If desired, auxiliary buffers may be adapted centrally to the ends of the frames, and caused to project beyond the curved heads when uncoupled, in order to prevent shocks when the wagons or carriages are brought together for coupling up, or when otherwise subjected to shocks.

Having thus fully described my invention, I claim as new and desire to secure by Letters Patent—

1. In a car-coupling, the combination, with a series of car-trucks or wheeled frames, of a jointed coupling and traction-bar whose sections are pivoted and connected at or near the center of the trucks, whereby said bar is made practically continuous through the whole train and the tractive force is applied at the centers of the trucks, as shown and described, for the purpose specified.

2. In car-couplings, in combination with traction-bars pivoted at or near the truck centers, the truck or car frames formed with rounded ends, substantially as described and shown.

3. The combination, with trucks or frames having rounded ends, of traction devices, which are pivoted to said trucks or frames at points from which said rounded ends may be described as arcs of circles, as shown and described.

4. In a car-coupling, the combination, with the car trucks or frames having rounded ends and buffer-springs, of the traction-bar pivoted at the center of the latter and couplings for connecting the sections of said bar between the trucks, whereby the trucks or frames are held in elastic contact, as set forth.

ROBT. F. FAIRLIE.

Witnesses:

JOHN CARRUTHERS,
9 *Great Queen Street, Westminster.*
WM. DULIN,
*Engineer*, 2 *Fenborough Road, W. London.*